United States Patent [19]

Gross et al.

[11] 4,117,829

[45] Oct. 3, 1978

[54] FUR-LIKE PHOTOTHERMAL CONVERTER SURFACE

[75] Inventors: Daniel Gross, Carouge, Geneva; Pierre Genequand, Geneva, both of Switzerland

[73] Assignee: Battelle Development Corporation, Columbus, Ohio

[21] Appl. No.: 757,202

[22] Filed: Jan. 6, 1977

[30] Foreign Application Priority Data

Jan. 8, 1976 [CH] Switzerland ................ 156/76

[51] Int. Cl.$^2$ ................................................. F24J 3/02
[52] U.S. Cl. ................................. 126/270; 126/271; 237/1 A; 136/89 PC
[58] Field of Search .............. 126/270, 271, 400; 237/1 A; 136/89 PC, 206

[56] References Cited

U.S. PATENT DOCUMENTS

| | | | |
|---|---|---|---|
| 2,998,006 | 8/1961 | Johnston | 126/271 |
| 3,194,228 | 7/1965 | Bangues | 126/271 |
| 3,229,682 | 1/1966 | Permutter et al. | 126/270 |
| 3,379,394 | 4/1968 | Bialy | 126/270 |
| 3,780,722 | 12/1973 | Swet | 126/270 |
| 3,902,474 | 9/1975 | Pyle | 126/270 |
| 3,985,116 | 10/1976 | Kapany | 126/270 |
| 4,005,698 | 2/1977 | Cuomo et al. | 126/270 |
| 4,038,964 | 8/1977 | Drew | 126/271 |

FOREIGN PATENT DOCUMENTS 1,576,354  6/1969  France ................ 126/270

*Primary Examiner*—John J. Camby
*Assistant Examiner*—Henry C. Yuen
*Attorney, Agent, or Firm*—Thomas W. Winland

[57] ABSTRACT

In order to reduce energy losses by convection and/or thermal radiation from the radiation-absorbing surface of a photothermal energy converter for the utilization of solar energy, the said surface is provided with a multiplicity of projecting fibres sufficiently close to one another to suppress convection, each fibre consisting of a material which is permeable to the incident luminous radiation to be absorbed and at least partly opaque to infrared thermal radiation which may be reemitted from the said surface whereby energy losses by radiation are reduced.

The fibres can be, for example, glass or plastic fibres and can be integral with or implanted in the said surface. Preferably, the fibres have diameters in the range 25 to 500 micrometers, a height of the order of 5 cm, and an average distance between fibres in the range 100 to 5000 micrometers.

26 Claims, 16 Drawing Figures

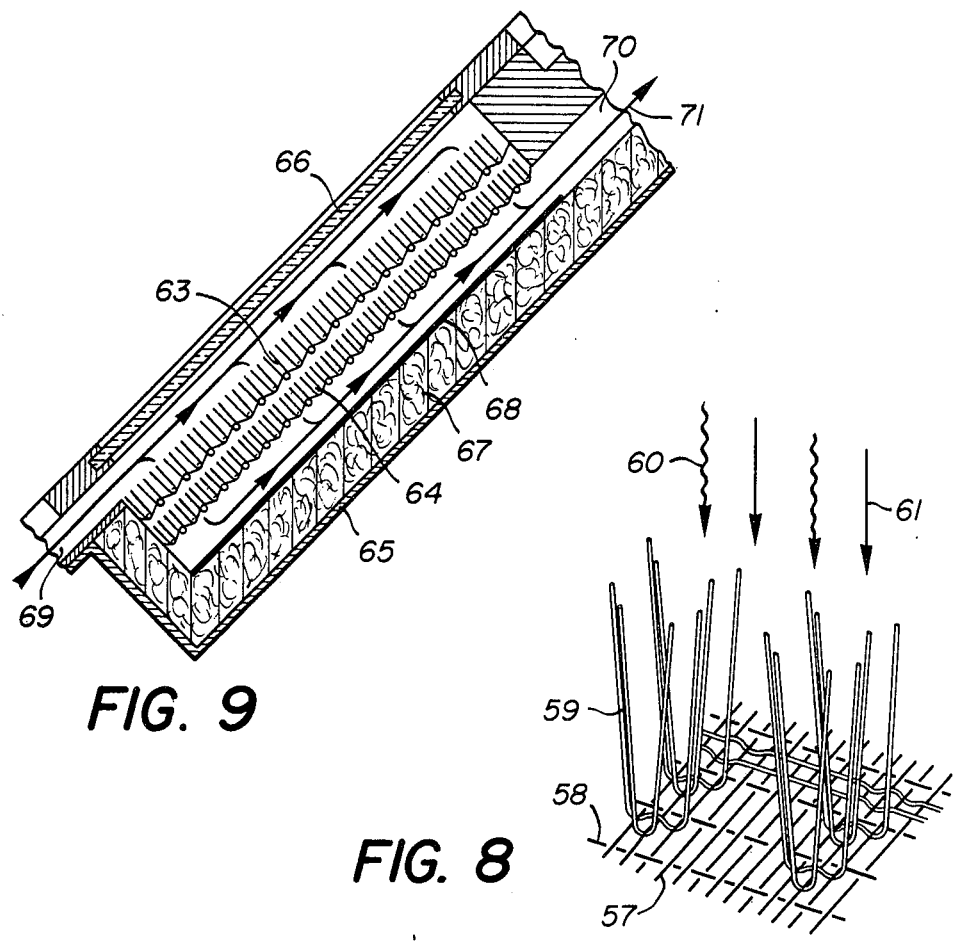
FIG. 9
FIG. 8
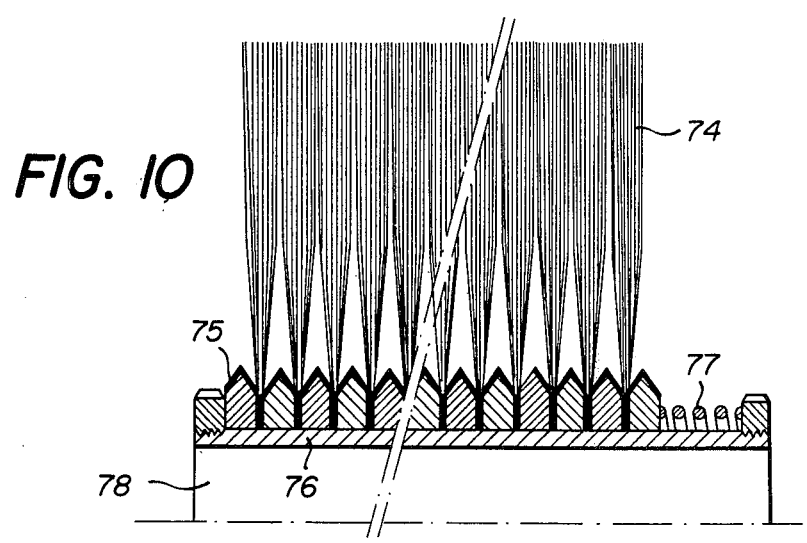
FIG. 10

FUR-LIKE PHOTOTHERMAL CONVERTER SURFACE

BACKGROUND

In the field of utilization of solar energy, the photothermal conversion process is of prime importance. This process enables for example thermal energy to be produced for domestic heating or air conditioning, and enables hot water (pressurized) or steam to be obtained for the production of mechanical energy or for various other industrial processes etc. Photothermal conversion may be defined as the absorption of an incident electromagnetic radiation (such as solar radiation) by an absorbent collecting surface, with subsequent heating of this collecting surface, which in its turn heats a determined heat exchanger fluid or load. In general one seeks to obtain the highest possible operating temperature for a given incident radiation power per unit of converter surface (the intensity of solar radiation is notably limited and depends also on the hour of the day, the meteorological conditions etc. With regard to direct solar radiation, optical concentration may be used by means of collecting mirror or lens systems). To obtain a high operating temperature, effective thermal insulation of the two faces of the converter is necessary in addition to high incident radiation intensity. Thermal insulation of the face exposed to the incident radiation however is difficult to effect, because this face has at one and the same time to absorb the incident radiation and refrain from emitting thermal infrared, so that it must be made absorbent with regard to incident radiation and reflecting with regard to emitted radiation.

In any photothermal converter, three well known thermal loss processes must be considered: losses by thermal infrared radiation omission, cooling by convection to the interior of the gaseous volume separating the converter from its immediate surroundings, and losses by thermal conduction.

In recent years numerous methods have been proposed for minimizing the total of said thermal losses, and consequently increasing the photothermal conversion efficiency. To reduce radiation losses it has been proposed for example to use surfaces which are selective to radiation. These surfaces, of low thermal emissivity, in particular allow practically complete absorption of the incident solar radiation, while strongly reducing losses by infrared radiation from the converter. However, the presence of such surfaces contributes to strongly increasing the cost of the converters, and poses long term stability problems. Three main methods are known for reducing convection losses. The first consists of stacking several transparent cover plates above the converter so as to confine the convection mechanism to within volumes of lower temperature differences. However this plate stacking contributes to increasing losses by reflection of the incident radiation, and results in an increase of the weight and cost of the device. The second method consists of filling the space above the converter with a gas having a thermal conductivity lower than air, while the third method consists of completely evacuating this air space. However the second method enables only a partial reduction of the conduction/convection losses to be obtained. The third method tends to be costly, as it requires the presence of absolutely airtight enclosures which have a low degassing rate. The construction of long life airtight enclosures is moreover difficult, bearing in mind that these enclosures are subjected to considerable thermal cycles (variations in the pressure of the thermal insulation gas) and to other atmospheric attack, undermining in particular its airtightness. Finally, in the particular case of application to solar collectors, the appearance of any crack in the covering glass (hail, falling branch, thrown stones ...) has the inevitable effect of making these collectors unworkable by causing escape of the low thermal conductivity gas.

For collecting the solar energy it has also been proposed to use a honeycomb structure resting on a conventional absorbing surface. This structure is preferably made of fine glass plates or tubes, which may typically have a height of 6 to 25 cm, a diameter of 0.5 to 1.5 cm and a thickness of 0.2 to 0.3 mm. Such a structure has the advantage of serving as a light guide for the incident solar radiation, which undergoes a multiplicity of reflections and refractions before being absorbed by the actual converter. Where the height-diameter ratio is sufficiently high, such a structure may also serve as a thermal barrier for the re-emitted infrared radiation, which is compelled to follow a diffusion process before being able to reach the exterior, with consequent reduction in radiation losses. However, such a structure does not give optimum reduction in convective air movements, especially where there is a large temperature difference between the converter and its immediate surroundings, and/or where the converter is inclined. In this respect, a limiting air layer of small thickness (about 1 mm) and of unstable buoyancy notably forms above a horizontal heated surface, and convective filament-type movements develop from this limiting layer which mix by convection with the air layers situated further above the hot surface. It is equally known that this instability, in the case of an inclined cellular structure, takes the form of regular circulation within each cell.

As these constituent cells of the honeycomb structure have lateral dimensions which are considerably greater than the characteristic diameter of these filament-type convective movements (or than the thickness of the movements assuming the form of a regular circulation-ratio greater than 2), it follows that such a structure is not capable of suppressing the convective air movements in an optimum manner, and consequently preventing the cooling of the converter by convection. Moreover, this honeycomb structure is relatively thick, given the height (6 to 25 cm) of the cells, so that a solar collector equipped with such a structure risks being too heavy and too bulky for the majority of applications. The need to use a considerable quantity of glass for this structure (of the order of 12 to 60 kg/m$^2$ of converter) further leads to a total weight and prices which are hardly competitive. Moreover, this large mass of glass gives rise to very high thermal time constants, so that one or several hours of continuous exposure to solar radiation are necessary before such a collector attains its working temperature.

The object of the present invention is to remedy the various aforementioned disadvantages, by proposing a photothermal converter of high conversion efficiency and economical cost.

SUMMARY

The present invention provides a photothermal converter comprising a surface of which at least one of the faces, intended for exposure to an incident luminous radiation, is endowed with strong absorbent power in respect of this radiation, and further comprising a multiplicity of projecting fibres on said face extending substantially parallel and substantially equidistant to each other, each fibre consisting of a material which is both permeable to said luminous radiation and at least partially opaque to the infrared thermal radiation which may be re-emitted by said surface, said multiplicity of fibres thus constituting an antiradiation and anticonvection structure which on the one hand enables the losses by infrared thermal radiation to be reduced, and on the other hand enables convection losses to be suppressed.

In the present specification, the term "incident luminous radiation" signifies any electromagnetic radiation originating from a high temperature thermal source, i.e. any electromagnetic radiation capable of conveying considerable thermal energy, this radiation having a spectrum situated entirely or only partially in the visible spectrum, or a spectrum situated completely outside the visible spectrum. Advantageously, the spectrum of such radiation may lie between 0.25 and 5 $\mu$m. The high temperature thermal source able to emit such radiation may be either a source of natural radiation such as the sun, or artificial sources of radiation such as bodies raised to incandescence (if possible placed under vacuum to reduce losses), flames or gaseous discharges.

In the present specification, the term "fibre" signifies any filiform element of finite length, the cross-section of which remains small in relation to its length. Such an element may be either solid or hollow, and either be of circular or non-circular cross-section, for example elliptical or flat.

The heating of the absorbent plate resulting from its exposure to the incident luminous radiation may be used advantageously in its turn in known manner, to heat either heat transfer fluids (such as water, steam, oil, air, reactive gas etc.), or loads (i.e. immobile bodies placed in the vicinity of the absorbent surface).

The heating of a load by incident radiation acting by way of a converter in accordance with the invention may in effect present certain advantages over other known methods of heating. It is possible firstly to place the load/converter assembly at a certain distance from the radiation source. Such a possibility enables the load to be disposed for example in a corrosive environment, under vacuum, in controlled magnetic or electrical fields etc. Radiation heating is likewise a very suitable heating from the chemical and/or biological viewpoint (non-contamination). Radiation heating may also be initiated, controlled and stopped more rapidly than electrical resistance heating or flame heating, the two latter requiring fairly thick walls between the heating agent and the load. Radiation heating is also less costly than microwave heating, for example. Examples of loads which may be heated by the converter according to the invention are chemical reactions for ultra-pure materials, constant temperature heating of microbiological preparations, cooking or frying food (for example the preparation of food dishes in casseroles or plates equipped with a sealed photothermal converter).

The accompanying drawings illustrate diagrammatically and by way of example several embodiments and modifications of the photothermal converter according to the present invention, shown either alone or as part of various devices.

DRAWINGS

FIG. 3b is a view to a larger scale, showing a detail of FIG. 3a.

FIG. 8 is a perspective view showing another embodiment.

FIG. 9 is a longitudinal section showing a conventional solar collector in which this embodiment is incorporated.

FIG. 10 is a longitudinal section, showing another embodiment.

PREFERRED EMBODIMENTS

Figure 1:
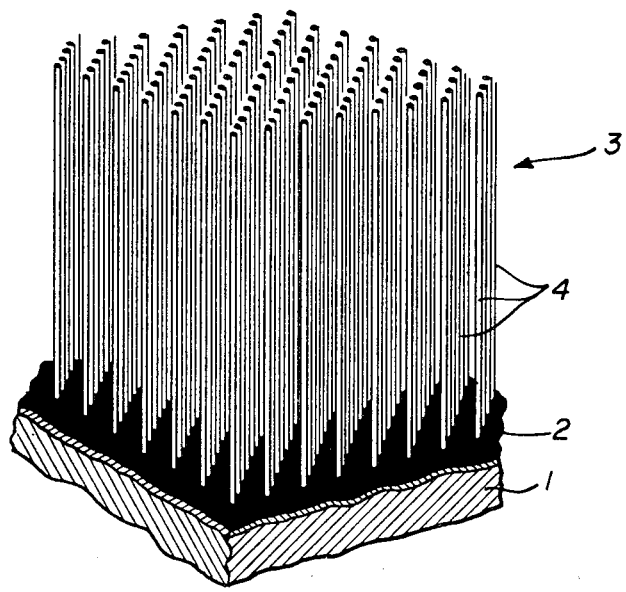
FIG. 1 is a partial perspective view showing a first embodiment of the converter according to the invention.

The photothermal converter shown partially in FIG. 1 comprises a metal baseplate 1 covered with a layer 2 of a material endowed with strong absorption power for incident luminous radiation, and on which there is fixed a dense network of fibres 3 which extends substantially over the whole surface of the plate 1. The network 3 is composed of a multiplicity of transparent fibres 4 of substantially uniform length and substantially circular section, fixed individually by one of their ends into the layer 2 and all oriented substantially perpendicularly to the plate 1, to remain spaced apart substantially by a uniform amount. The aforementioned network of fibres 3 is designed to perform various functions, as will be evident hereinafter. To be able to perform these functiona, the network must possess two well defined groups of characteristics, one of which relates to the constituent material of the fibres and the other to the geometrical dimensions of the fibre network. Thus, each of the fibres 4 must be made of a material which is both transparent (i.e. non-absorbent and non-diffusive in respect to the incident radiation, and opaque (i.e. strongly absorbent and emissive in all directions) in respect of infrared thermal radiation (the absorptivity and thus the emissivity for intermediate wavelengths being able to be adjusted in accordance with the operational temperature of the converter).

Advantageously, such a material must also possess low thermal conductivity, and be chemically and structurally stable at the operating temperature of the converter, and if possible as far as the "zero flow temperature" of the converter. Finally, the material must have such mechanical characteristics that the fibres possess sufficient rigidity so as not to bend under their own weight.

It is particularly preferred to use as the constituent material of the fibres, inorganic materials such as glass, silica and possibly gypsum. Organic materials such as Mylar or polyester may also be used. Likewise, for the network to be able to perform the aforementioned functions, the geometrical dimensions of the fibre network must be within the following ranges: each of the constituent fibres of the network must have a length of 1 to 10 cm and a diameter of 25 to 500 $\mu$m, and the distance between the fibres of the network must be 100 to 5000 $\mu$m, with a fibre density (number of fibres per unit area of the baseplate) of 4 to 10000 fibres per $cm^2$. It is particularly preferred to use a network composed of fibres with a length of the order of 5 cm and a diameter of the order of 70 $\mu$m, spaced apart so as to give a density of the order of 500 fibres per $cm^2$ and a volumetric density or filling percentage (proportional to the quotient of the sum of the fibre cross-sections and the total surface of the baseplate) of less than 2%.

The described converter operates in the following manner when exposed to incident luminous radiation. The luminous radiation which strikes the absorbent layer 2 after traversing the transparent fibre network 3 is continuously absorbed by the layer 2, so that the baseplate 1 heats up progressively under the effect of this absorption, until it reaches its operating temperature (temperature rapidly attained because of the low thermal mass of the fibres 4). The heat so obtained may then be transferred to a determined load or heat transfer fluid, for various applications.

The purpose of the fibre network 3 is to reduce to a minimum the thermal losses outwards from the converter (which inevitably result from the heating of the absorbent plate), while allowing the best possible penetration of the incident luminous radiation to the absorbent plate (minimization of optical losses on penetration). These different results are obtained because of the multiple functions performed by the fibre network 3, which at one and the same time acts as a light guide for the incident radiation, as a thermal barrier for the infrared thermal radiation re-emitted, and as an inhibiter for convective gas movements.

These different functions will be examined in detail hereinafter, together with the manner in which they affect the various optical and thermal losses.

Figure 2A:
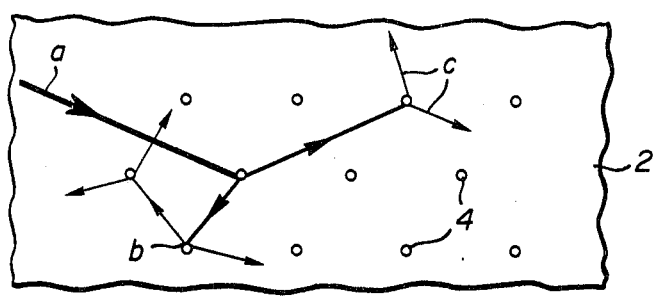
FIG. 2a is a partial view from above of FIG. 1 to a larger scale, showing the path of an incident luminous ray through the front part of the converter.
Figure 2B:
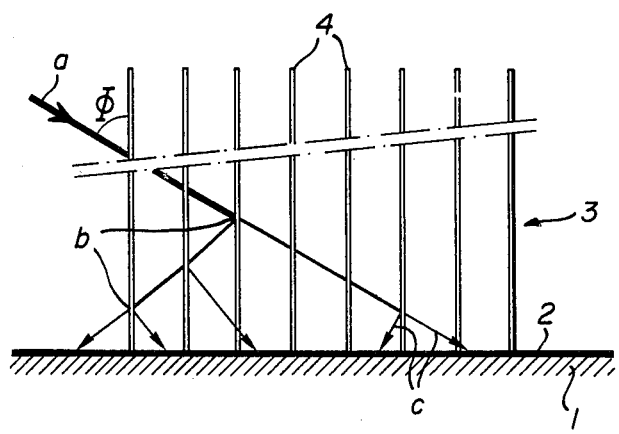
FIG. 2b is a partial longitudinal diagrammatic sectional view of FIG. 1 to a larger scale, also showing the path of the incident ray.

The penetration of the incident luminous radiation as far as the absorbent plate may be accompanied by two types of optical losses, namely losses due to the presence of the fibre network (possibility of outward retrodiffusion of part of the radiation traversing the fibres) and losses due to incomplete absorption by the absorbent plate. FIGS. 2a and 2b illustrate the path of an incident radiation beam (a) through the network 3 of transparent fibres 4. It can be seen from the figures that the incident beam (a) on striking the fibres 3 at a certain number of points (b) undergoes a plurality of reflections and refractions, so that it is reflected into a multitude of secondary beams (c), which all reach the absorbent surface 2 of the converter plate 1. All the secondary deflected beams (c) are in fact necessarily localized on cones the axis of symmetry of which are constituted by the fibres, these cones all intersecting the absorbent layer 2. Furthermore, that portion of incident radiation trapped inside the individual fibres (total reflection) is also compelled to reach the base of the fibres. The individual fibres 4 and the interstices existing between the fibres thus act as a light guide for the incident radiation, whatever the direction of this latter relative to the plate 1, so compelling almost the whole of this radiation to strike the absorbent surface 2 of the converter plate 1.

The only optical losses which can be produced while passing through the fibre network are losses which may result from the process of absorption or diffusion by the fibres (absorption if the fibres are not completely transparent, and diffusion if the fibres have a surface which is not completely smooth from an optical point of view or if they have centers of diffusion within their volume). It should also be noted that only at the most one half of the radiation thus absorbed or diffused emerges outwards to give a true optical loss (optical loss by retrodiffusion outwards), the remainder, representing not less than half of this radiation, succeeding in reaching the absorbent plate. It is further found that the retrodiffusion optical losses increase with the angle of incidence of the incident luminous radiation (angle between the radiation and the normal to the absorbent plate), but these are always a minimum whatever this angle of incidence. By way of example, it has been found that for a glass fibre network with 5 fibres/$mm^2$ (network consisting of glass fibres 5 cm high and 50 $\mu$m diameter, obtained by drawing "E glass"), a transmission factor is obtained for the incident luminous radiation through this network of about 99% for zero angle of incidence, about 97% for an angle of incidence of 45°, and about 95% for an angle of incidence of 60°. To these optical losses through the fibre network are added the optical losses due to incomplete absorption by the absorbent plate. It is well known that these latter optical losses depend essentially on the nature of the constituent material of the layer and the state of the surface of the layer (rough or properly smooth). By way of example, it has been found that an absorption factor of the order of 95% is obtained with an absorbent layer consisting of a mixture of Scotch No. 582 adhesive and carbon black. Considering the aforementioned optical losses, a total optical conversion efficiency (product of the transmission factor through the fibre network and the absorption factor of the absorbent plate) of the order of 94% may thus be obtained. This optical conversion efficiency is independent of the temperature which may be reached by the converter.

The heating of the absorbent converter plate results in only two types of thermal losses outwards from the converter, namely infrared thermal radiation losses outwards, and thermal conduction losses both along the fibres and into the stationary air between the fibres. One of the essential characteristics of the converter according to the invention is the fact that the presence of the fibre network prevents any formation of convective air movement between the fibres, and thus allows convection losses to be totally suppressed.

This total suppression of the convention losses by the fibre network has been demonstrated experimentally by making comparative loss measurements in a Vacuum and in air at atmospheric pressure (using temperatures which do not exceed the normal operating temperature of the converter, i.e. temperatures of the order of 80° to 300° C). The determined difference between the two cases is substantially equal to the losses by thermal conduction into the air (losses for which the values are well known and abundantly indicated in the literature), thus showing that the convection losses are zero. It has been verified experimentally that a fiber network with 3 fibers/mm² and 10 fibers/mm² (fiber diameter 40 μm and length 2 cm) exhibit no convection losses at atmospheric pressure and at temperatures up to 151° C.

This suppression of convection losses is explained by the geometry and dimensions of the fibre network, which result in a large interface leading to considerable capillary friction coefficients, which in practice inhibit any convective air movement under normal temperature conditions. A simplified theory is attempted hereinafter for explaining this suppression of convection as a function of the geometry of the fibre network and the applied temperatures.

In the simple case of two spaced-apart plates subjected to a temperature difference $\Delta T$ (these plates being situated in air at atmospheric pressure), there is a well known theory which enables the temperature difference $(\Delta T)_s$ to be calculated, from which the convection onset between the plates may be determined as a function of the distance $\delta$ between the plates. This temperature difference $(\Delta T)_s$ is given under this theory by the equation:

$$(\Delta T)_s = 48.2 \times \delta^{-3}$$

where $\delta$ is expressed in cm and 48.2 is a constant. (This equation shows that convection begins to be established for a temperature difference of 0.4° C in the case of a distance $\delta$ of 5 cm, 6° C for a distance of 2 cm, 48° C for a distance of 1 cm, 386° C for a distance of 0.5 cm and about 3000° C for a distance of 0.25 cm). It can be shown that this theory is valid in the case according to this invention, by replacing the actual distance $\delta$ in the above equation by an "equivalent distance $\delta_{eq}$" such that:

$$\delta_{eq} = \frac{1}{\frac{\pi}{2} n_f d_f + \frac{1}{n_f}}$$

where $d_f$, $h_f$ and $n_f$ are the diameter, height and density of the fibres (i.e. the number of fibres per unit area of the plate) respectively. The equation which defines this equivalent distance $\delta_{eq}$ may be calculated by establishing an equivalence between the concept of "available height for free circulation of air" in the simple case of two spaced-apart plates (equal in this case to one half the distance $\delta$) and in the case according to this invention, by assuming that in the case according to this invention this value is defined by the height over which the circulating air in the fibres "experiences" friction similar to that experienced by the air circulating in the vicinity of the immobile middle layer in the simple case of two plates. The following table, Table A, gives the values of $\delta_{eq}$ obtained for different dimensions of the fibre network (included in Table A are some infrared transmission factor ($\epsilon_f$) values, to be explained and discussed below, for the fibre network as a function of these dimensions):

TABLE A

| | | | | |
|---|---|---|---|---|
| $h_f$ (in cm) | 3 | 5 | 5 | 5 |
| $d_f$ (in μm) | 50 | 70 | 700 | 7000 |
| $n_f$ (fibres/mm²) | 10 | 5 | $5 \times 10^{-2}$ | $5 \times 10^{-4}$ |
| $\delta_{eq}$ (in cm) | 0.12 | 0.17 | 1.33 | 3.92 |
| $\epsilon_f$ (dimensionless) | 0.12 | 0.10 | 0.52 | 0.91 |

This table shows that in the case of fibres with a diameter less than 500 μm and a density greater than 4 fibres/cm² (i.e. for a fibre network obeying the dimensions claimed heretofore), the value of the equivalent distance $\delta_{eq}$ is much less than the value for convection to occur (for temperature gradients substantially identical to those which occur with a converter operating at normal temperture). This same table also shows that the same does not apply in the case of "cylindrical elements" with a diameter greater than 500 μm and a density less than 4 fibres/cm² (i.e. for elements of dimensions greater than the dimensions claimed heretofore, and which cannot be designated as "fibres"). In fact, the equivalent distance $\delta_{eq}$ for these elements is much greater than the value for convection to occur, so that such elements become completely ineffective in suppressing convection. As the convection losses are thus totally suppressed in the converter according to this invention, the thermal losses outwards from the converter are reduced simply to infrared thermal radiation losses and conduction losses along the fibres and into the stationary air between the fibres.

Figure 2C:
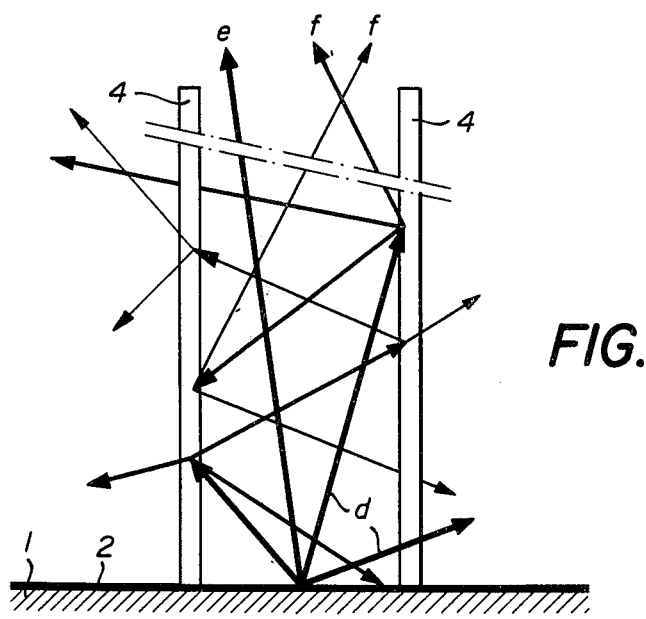
FIG. 2c is a sectional view analogous to that of FIG. 2b but to a still larger scale, showing the path of the infrared thermal radiation re-emitted towards the front of the converter.

With respect to the infrared thermal radiation which may be re-emitted by the baseplate, the fibre network 3 act as microporous thermal insulation in accordance with a mechanism analogous to glass wool. The re-emitted infrared radiation can reach the exterior of the fibre network 3 only essentially by a radiation diffusion process. FIG. 2c illustrates such a diffusion process (for simplification purposes, only two fibres are shown on the drawing, and only some of the thermal radiation beams emitted or absorbed by these two fibres). As the sum total of all the lateral surfaces of the fibres (equal to the fibre-gas interface) is many times greater than the corresponding surface of the baseplate 1, only a relatively small part (e) of the infrared thermal radiation (d) emitted by the absorbent surface 2 (namely that part emitted substantially parallel to the fibres 4) is able to directly emerge from the fibre network. In contrast, the infrared thermal radiation emitted obliquely is absorbed by the fibres. The result is weaker indirect re-emission by corresponding fibre portions. Part of this re-emission is directed upwards from the fibre network (the part designated by the reference letter f on the drawing), part is directed downwards, and part is directed through the network. The fibres reach thermal equilibrium by the action of this mechanism, their temperature and the thermal radiation which they emit reducing from their base to their point. On a statistical basis, this infrared thermal emission-absorption-re-emission process is a diffusive process. Such a process (which is produced between fibres with a thermal gradient) has the advantage of dissipating less radiation energy outwards from the converter than a direct radiation transfer (non-diffusive) from the absorbent surface.

The thermal barrier function exercised by the fibre network with respect to the infrared thermal radiation re-emitted by the baseplate has been determined experimentally by measurements of comparative losses made on a baseplate provided with a fibre network and a plate without a network respectively. It has been found that the reduction in the radiation losses is of the same order of magnitude as that obtained with honeycomb structures known to the state of the art. However, the fibre network has the great advantage over honeycomb structures of requiring a quantity of material (glass or plastics) for equal radiation loss reductions which is considerably less (by approximately one order of magnitude), resulting not only in a much smaller weight and cost, but in considerably reduced thermal inertia. A further simplified theory is attempted hereinafter to explain this reduction in radiation losses as a function of the geometry of the fibre network and the applied temperatures.

In the simple case of two spaced-apart plates at two different temperatures $T_0$ and $T$, there is a further well known theory which enables the direct radiation heat transfer $\delta$ between the two plates to be calculated as a function of the temperatures $T_0$ and $T$. This direct radiation heat transfer $S$ is given under this theory by the equation:

$$S = \Sigma_e \sigma (T^4 - T_0^4)$$

where $\Sigma_e$ is the emissivity of the hot plate (at the temperature $T$; the emissivity of the cold plate being assumed equal to unity), and $\sigma$ the universal Boltzmann constant.

If any antiradiation structure is interposed between the plates (such as a honeycomb structure known to the state of the art or a fibre network according to this invention), there is no longer direct radiation transfer between the plates, but only indirect radiation transfer by way of the lateral surface of this structure. It can be shown that the aforementioned theory remains valid, if a coefficient $\epsilon_f$ is added to the previous equation to represent the infrared thermal transmission factor through the structure. It can be shown that this transmission factor $\epsilon_f$ is proportional to the quotient of the surface area of the plates and the lateral surface area of the structure, or proportional to a transport factor $h_r$ characteristic of a determined structure. It can also be shown that for a honeycomb structure the transmission factor $\epsilon_f$ is given by the equation $\epsilon_f = 0.68 \times e/h$ where $e$ is the diameter of the cells and $h$ their height. It can likewise be shown that for a fibre network the transmission factor $\epsilon_f$ may be calculated by the equation:

$$\epsilon_f \simeq 2/2 + d_f h_f n_f$$

where $d_f$, $h_f$, $n_f$ are the diameter, the height and density (number per unit surface area) of the fibres respectively.

Table A gives the transmission factor values $\epsilon_f$ for different typical dimensions of the fibre network. This table shows that the transmission factor $\epsilon_f$ is low for fibres with a diameter less than 500 μm and a density greater than 4 fibres/cm² (i.e. for a fibre network obeying the dimensions claimed heretofore), but infrared radiation losses become significant for fibres, or rather "cylindrical elements", lying outside these dimensions, so that the fibre network ceases to be effective as a thermal barrier when it is outside the claimed dimensions.

Finally, the losses by conduction along the fibres or into the stationary air are reduced. The losses by conduction into the stationary air (which is often used as thermal insulation) are notably very small.

The losses by conduction along the fibres may be minimised by choosing, for a determined distance between fibres and fibre-air interface, fibres which are sufficiently long and thin. It is advantageous if the material chosen for the fibres is of sufficiently low thermal conductivity (the advantage of glass in relation to crystalline material).

Thus, when the converter according to the invention is exposed to the sun's radiation, it develops an approximately linear uniform internal temperature gradient $\Delta T$ between the bases and points of its fibres (both with regard to the fibres themselves and the air situated between the fibres, and the thermal radiation emitted between these latter), which indicates an apparent thermal conductivity comparable with that of usual microporous thermal insulation (such as glass wool, cork etc.).

This apparent thermal conductivity represents the sum of the thermal loss processes by radiation, conduction into the gas and conduction into the fibres. The thermal insulation is thus better the longer the fibres.

As the total thermal losses are low, the converter according to the invention may be advantageously used in a flat conventional solar collector fitted with a single cover glass and filled simply with air (the cover glass serving for protection against dust, breakage of fibres etc.). To further reduce losses by thermal conduction into the gas, the air in this flat collector may be replaced by another gas such as $CO_2$ or freon. The converter according to the invention may also be incorporated in collectors which are not flat, for example tubular, or used with solar concentrators (mirrors, Fresnel lenses). The converter according to the invention may also be incorporated in the bottom and/or in the side walls of a sealed enclosure designed to serve for example as a chemical reactor, a constant temperature enclosure or a container (pan) for food to be heated, the front face of this sealed enclosure being constituted by a transparent plate.

Figure 3A:
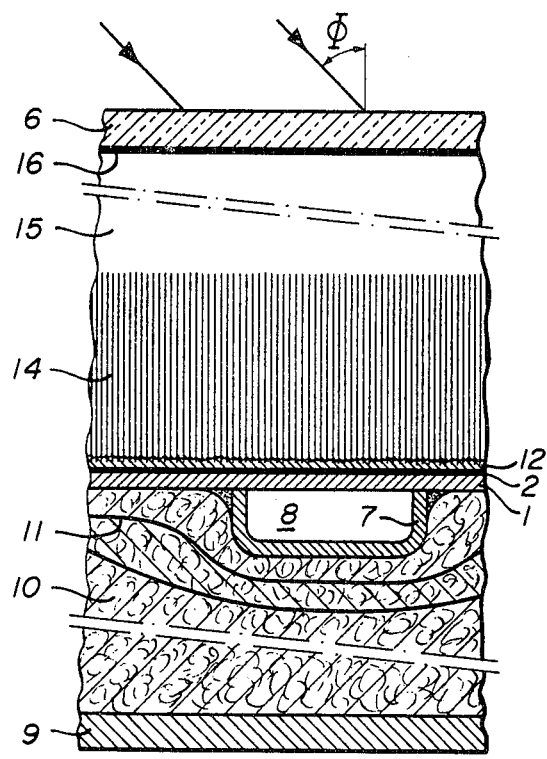
FIG. 3a is a partial longitudinal sectional view showing a first modification of the converter according to the invention, incorporated in a flat solar collector.
Figure 3B:
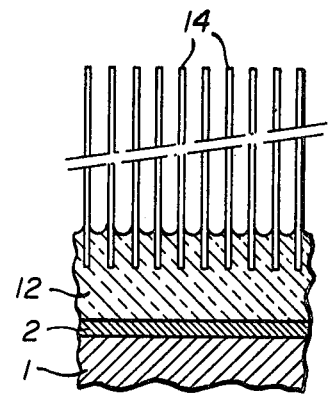
Figure 3C:
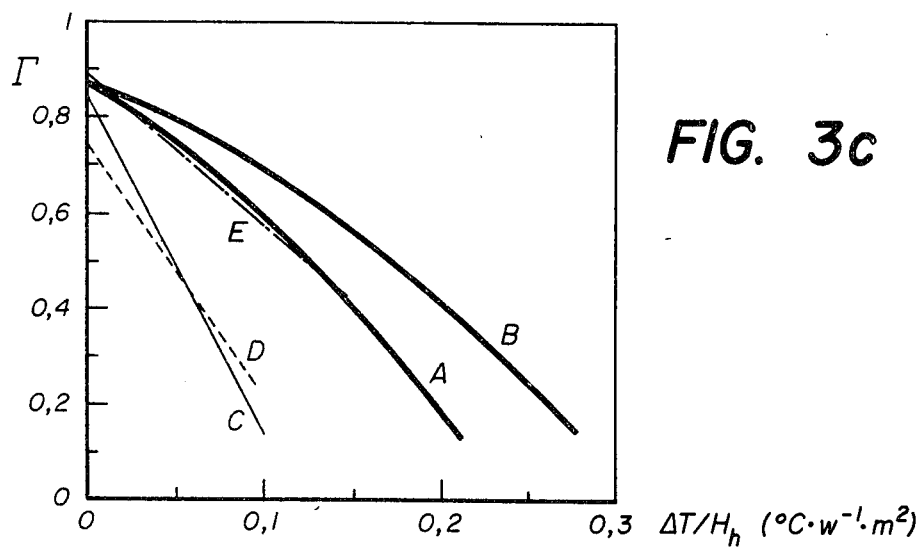
FIG. 3c is a diagram relating to the energy conversion efficiency of the collector of FIGS. 3a and 3b.
Figure 4:
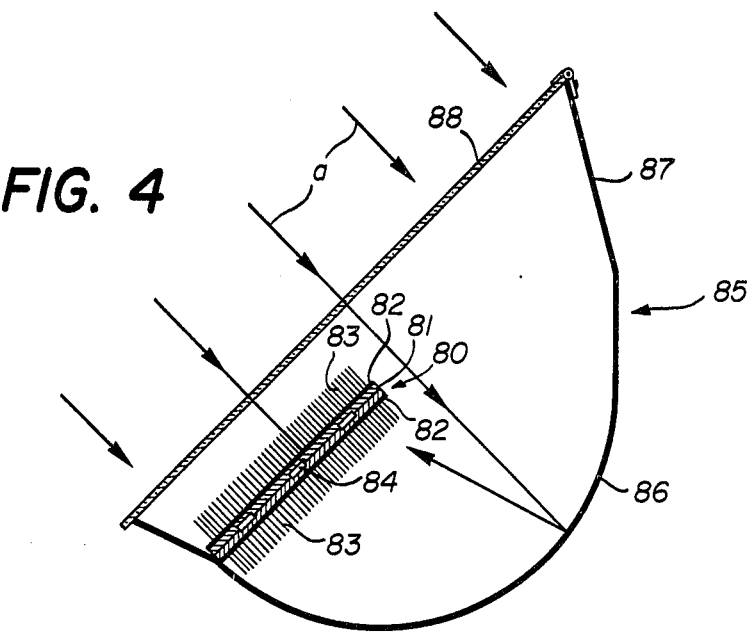
FIG. 4 is a longitudinal sectional view showing a second modification of the converter according to the invention, incorporated in a double exposure system.
Figure 5:
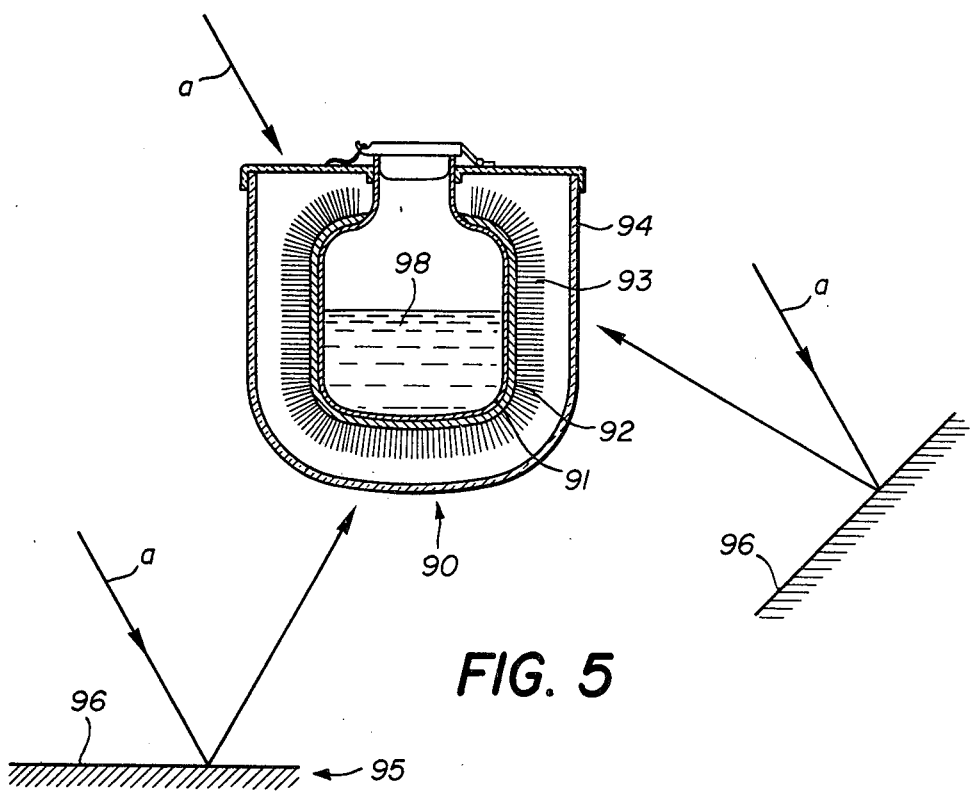
FIG. 5 is a longitudinal sectional view showing a third modification of the converter according to the invention, incorporated in a device intended for heating a load.

FIGS. 3 to 5 show some of the aforementioned applications. FIGS. 3a and 3b show the converter according to the invention incorporated in a conventional flat solar collector. The collector shown on these figures comprises a metal baseplate 1 disposed inside an enclosure the front face of which is constituted by a transparent glass 6. A plurality of heat transfer conduits 7 are welded to the rear face of the baseplate 1 and are designed to convey a heat transfer fluid 8 such as water, oil or a gas. The baseplate 1 is thermally insulated from the rear plate 9 of the collector in known manner, by an insulating material 10 such as glass wool or glass stone into which metal foils 11 may be inserted parallel to the plate 1, to act as a screen for the thermal radiation reemitted towards the rear of the collector. The front face of the baseplate 1 is covered with an absorbent layer 2, which is itself covered with an adhesive layer 12 in which a dense network of fibres 14 is implanted (FIG. 3b shows in a detailed manner the way in which the individual fibres 14 adhere to the layer 12). The adhesive layer 12 may consist for example of a natural adhesive material or a thermoadhesive material. It may be advantageous to use glass fibres implanted into a thin layer of solder glass. Such a structure has the advantage of retaining its thermal stability up to temperatures of the order of 300°C. Moreover, the glass fibres not only have a very low thermal conductivity but possess all the required optical properties to a very high degree. The space 15 between the fibre network 14 and front glass 6 is advantageously filled with a gas such as air, $CO_2$ or freon. The gaseous space 15 serves to further reduce the thermal losses from the converter. It is also important for the entire fibre network to remain dry, any evaporation-condensation cycle occurring inside the fibre network risking to act as a thermal short circuit. In the case of a non-airtight collector in contact with the atmosphere and used in an inclined or vertical position, it is possible to provide an internal collection and drainage channel for the water droplets which may condense on the coldest internal part of the collector namely the glass 6. In this way the fibre network is prevented from becoming damp.

To reduce the radiation losses to a minimum, the interior of the transparent front glass 6 may be coated in known manner with a transparent layer 16 of a material such as indium oxide $In_2O_3$ mixed with tin oxide $SnO_2$, the effect of which is to reflect the residual infrared thermal radiation emitted from the top of the fibres 14. The addition of this supplementary layer 16 has however the disadvantage of causing an increase in the reflection losses of the incident radiation. It is therefore advantageous in certain cases to cover the transparent plate 6 with non-reflecting contaings.

To demonstrate properly that the converter according to the invention enables the total optical and thermal losses to be minimised, an attempt is made hereinafter to evaluate the overall conversion efficiency $\Gamma$ of the flat collector described in FIGS. 3a and 3b, as a function of the quotient of the temperature rise $\Delta T$ of the baseplate and the solar radiation intensity $H_h$, and then compare the efficiency thus obtained with those which can be obtained in analogous collectors known to the state of the art.

The overall conversion efficiency $\Gamma$ may be expressed as a function of the incident solar intensity $H_h$ and the various losses, by the following equation:

$$\Gamma = \cos\phi\, \Gamma_c \Gamma_f \Gamma_e - (S_b + S_f)/H_h$$

where $\Gamma$ is the overall conversion efficiency, defined as the quotient of the useful thermal power per unit surface area and the solar radiation $H_h$ (dimensionless)

$H_h$ indicates the solar radiation ($Wm^{-2}$)

$\phi$ indicates the angle of incidence of the solar radiation to the normal to the baseplate $\Gamma_c$ indicates the transmission factor for the solar radiation through the converter glass (dimensionless)

$\Gamma_f$ indicates the transmission factor for the solar radiation through the fibre network (dimensionless)

$\Gamma_e$ indicates the absorption factor for the solar radiation inside the absorbent plate (dimensionless)

$S_b$ indicates the thermal losses towards the rear of the converter ($Wm^{-2}$) and $S_f$ indicates the thermal losses towards the front of the converter ($Wm^{-2}$)

The thermal losses $S_b$ and $S_f$ may be expressed as a function of $\Delta T$ (where $\Delta T$ is the temperature difference between the baseplate of the converter and the surroundings) by the following equations:

$$S_b = (\lambda_b/h_b)\Delta T$$

where $\lambda_b$ is the conductivity of the insulating material at the rear of the converter $Wm^{-1}\,°k)^{-1}$ and $h_b$ indicates the thickness of the insulating material ($m$), and $$S_f = \left(\frac{\lambda_{air}}{h_f} + \frac{\pi\lambda_f d^2}{4h_f e^2}\right)\frac{\Delta T}{1.2} + \Sigma_e \epsilon_f((T_o + \Delta T)^4 - T_o^4)$$

where:

$\lambda_{air}$ indicates the thermal conductivity of air $\lambda_f$ indicates the thermal conductivity of the fibres $h_f$ indicates the length of the fibres ($m$)

$d$ indicates the diameter of the fibres ($m$)

$e$ indicates the distance between fibres ($m$)

$\Sigma_e$ indicates the infrared emissivity of the absorbent plate (dimensionless)

$\epsilon_f$ indicates the infrared transmission factor through the fibre network (dimensionless)

$\sigma$ indicates the Boltzmann constant = $5.67 \cdot 10^{-8} Wm^{-2}(°k)^{-4}$ T indicates the temperature of the absorbent plate (°k), and $T_o$ indicates ambient temperature (°k)

(To take account of the additional temperature gradient between the fibre network and the cover glass, $\Delta T$ has been replaced by $\Delta T/1.2$ in the first term of $S_f$).

By assuming that the solar radiation arrives under normal incidence ($\cos\phi = 1$) and that the flat collector has the following dimensions (glass fibre network):

$h_b = 8 \times 10^{-2} m$ $h_f$ = variable parameter $d = 0.6 \times 10^{-4} m$ $e = 0.4 \times 10^{-3} m$ $T_o = 273°K$ and taking the following values for the other coefficients:

$\Gamma_c = 0.92$ (value given in the literature)

$\Gamma_f = 0.99$ (previously determined value)

$\Gamma_e = 0.95$ (previously determined value)

$\lambda_b = 4 \times 10^{-2}$ (value given in the literature)

$\lambda_{air} = 3 \times 10^{-2}$ (value given in the literature)

$\lambda_f = 1$ (value given in the literature for glass)

$\Sigma_e = 0.90$ (value found experimentally)

$H_h = 950\ Wm^{-2}$ (literature)

$\sigma = 5.6 \times 10^{-8}$ $\epsilon_f = 1.8\ e^2/h_f d$ (previously determined value)

the following expression is obtained for the overall conversion factor:

$$\Gamma = 0.87 - \left(0.50 + \frac{0.40 \times 10^{-1}}{h_f}\right)\frac{\Delta T}{H_h} + \frac{2.5 \times 10^{-13}}{h_f}\left(\left(273 + \frac{950\Delta T}{H_h}\right)^4 - 273^4\right)$$

The diagram of FIG. 3c shows various curves (A to E) representing the variation of the coefficient $\Gamma$ as a function of the ratio ($\Delta T/H_h$) for different types of collectors. The curves A and B relate to the solar collector of FIGS. 3a and 3b, comprising the converter according to the invention provided with glass fibres of height 3 cm (curve A) and height 5 cm (curve B). It is found that such a collector can reach an operating temperature of 100° to 200° C, the temperature being able to rise as far as 300° C (at "zero flow"). Curves C and D relate to a flat conventional collector comprising a single cover glass (curve C) and two cover glasses (curve D) respectively. Curve E relates to a conventional collector fitted with a typical prior art honeycomb structure. The diagram shows that the collector fitted with the converter according to this invention has an overall conversion efficiency $\Gamma$ considerably greater than conventional collectors, and equal to, or greater than, honeycomb fitted collectors; and that a fiber height of 5 cm is preferred over a fiber height of 3 cm.

FIG. 4 shows a modification of the converter according to the invention, both the front and rear faces being used as absorbent surfaces, said converter being incorporated in a double exposure system. The converter 80 shown in FIG. 4 comprises a baseplate 81 covered on its two faces with an absorbent layer 82, in each of which a fibre network 83 analogous to those previously described is implanted. In the baseplate 81 there are a plurality of conduits 84 designed to convey a heat transfer fluid. The converter 80 described is mounted inside a reflector system 85, comprising essentially a cylindrical reflector 86 with an extension in the form of a flat reflector 87. The reflector system 85 is closed at the front by a transparent cover glass 88 designed to allow incident solar radiation (a) to pass. The purpose of the reflector system 85 is to direct the direct or diffuse solar radiation towards the rear face of the converter, the front face of which is equally exposed to this radiation (path of rays shown diagrammatically on the drawing). The double exposure obtained has the advantage of increasing the total efficiency of the system, while allowing the insulation usually required for the rear face to be dispensed with.

FIG. 5 shows a further modification of the converter according to the invention, incorporated in a vessel with a double wall (containing air) for heating a load. The double wall vessel 90 shown in this figure is composed of an inner metal wall 91, the outer face of which is covered with an absorbent layer 92 in which a fibre network 93 is implanted, and an outer transparent wall 94. In proximity to the vessel 90 there is a reflector system 95 (which for example may simply consist of two suitably orientated flat mirrors 96) designed to direct the incident solar radiation (a) on to the walls of the vessel 90 containing a load 98. Under the effect of the direct and reflected solar radiation, the load 98 heats up progressively to the required temperature (for example of the order of 300° C). The temperature thus attained may be maintained for a relatively long period after stopping the incident radiation because of the good thermal insulation of the enclosure, so that such an enclosure may equally be used advantageously for temporary storage of heat for further utilisation.

In the various converter modifications described up to now, it has been stated that the constituent fibres of the network have a substantially circular cross-section. Such an arrangement however is not compulsory, and the cross-section of the fibres may take another form, for example elliptical or flat, without the fibre network so obtained losing its anti-radiation and anti-convection properties.

Figure 6A:
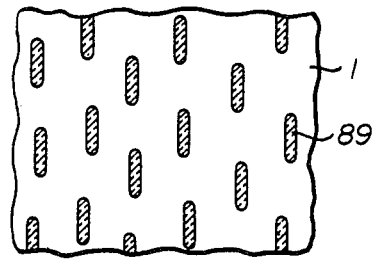
FIG. 6a is a partial view from above analogous to that of FIG. 2a, showing a fourth modification.

FIG. 6a shows (in a view from above) such a network composed of fibres 89 of flat cross-section, disposed substantially equidistant one from the other and distributed substantially at random. To satisfy the anti-radiation and anti-convection functions, such a network must have dimensions within the following ranges:

fibre height lying between 1 and 10 cm, cross-sectioned such that the larger dimension lies between 25 μm and the smaller dimension lies between 25 μm, and 500 μm, and the distance between fibres lies between 100 and 5000 μm. The use of the said flat shape has the main advantage of giving better rigidity to the fibres.

Figure 6B:
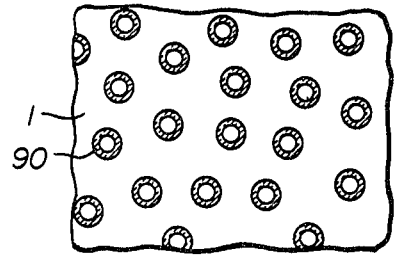
FIG. 6b is a view analogous to that of FIG. 6a, showing a fifth modification.

The constituent fibres of the network may equally be hollow instead of solid. Such an arrangement is shown in FIG. 6b (view from above) which shows a network of hollow fibres 90 distributed substantially at random and equidistant one from the other. To satisfy the anti-radiation and anti-convection functions, such a network must have dimensions within the following ranges:

fibre height between 1 and 10 cm, outer diameter between 25 μm and 5 mm with wall thickness between 10 μm and 500 μm, and distance between fibres of between 100 μm and 10 mm. The main advantage of such an arrangement is that it enables fibres of relatively larger cross-section to be used, resulting in better fibre rigidity. This is particularly important when using fibres of a plastics material such as polycarbonate, epoxy, methyl polymethacrylate, polyester, polyimide, methylpentene polymer, polyamide-imide, PTE, FEP, vinyl polyfluoride, ETFE, E-CTFE, phenol-formol-dehyde, polysulphone, silicone, polystyrene-ethylene-butylene etc.

Figure 6C:
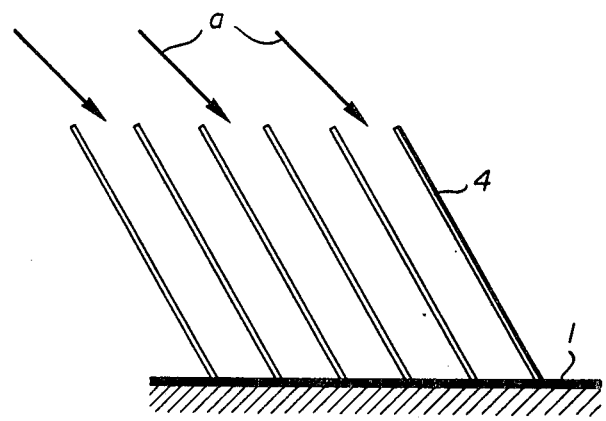
FIG. 6c is a longitudinal sectional view analogous to that of FIG. 2b, showing a sixth modification.

It has also been stated up to now that the fibres are implanted perpendicularly to the baseplate 1. Such an arrangement however is not compulsory, and for certain applications, in particular for solar collectors designed for use on the vertical or horizontal surfaces of buildings, it may sometimes be advantageous to use a fibre network inclined to the normal to the baseplate, so that the network is approximately in the plane of solar incidence (FIG. 6c). The essential requirement for the converter according to the invention is that the fibres remain substantially parallel to each other, whether they are implanted perpendicularly or inclined to the baseplate, the displacement from the average direction of the fibres remaining advantageously less than 5° (and preferably less than 2°). The fibre network may be distributed over the baseplate in a random manner (as shown in FIGS. 6a and 6b) or in a regular manner (as shown in FIG. 1). This latter case may be advantageous for a solar collector. The rows of fibres are then orientated such that the direct solar radiation undergoes only a minimum of reflections in the average of the various positions of the sun during the season of utilization. This enables fibres to be used having optical properties which are not completely optimum.

The baseplate 1 instead of being made of metal (for example iron, aluminum or copper) may be made of a different material such as glass, ceramic material or plastics.

The fibre network may be fixed to the baseplate covered with its absorbent layer by various methods such as mechanical implantation or implantation by electrostatic flocking, drawing mutliple fibres directly from a suitable converter plate, weaving, knitting or tufting (i.e. insertion of supplementary fibres into a tissue) similar to the methods used for manufacturing velvet or carpets, fixing in the manner used for certain brushes, growth of fine crystals of long needle shape (for example gypsum), extrusion of fibres through holes made in the converter surface etc.

FIGS. 7 to 10 show various embodiments of the converter according to the invention (shown either alone or incorporated in a solar collector etc.) constructed in accordance with some of the aforementioned methods.

Mechanical or electrostatic implantation methods require adhesives presence on the absorbent plate of an adhesive layer designed for retaining the fibres. To attain this, either a double coating (FIG. 3a and 3b) comprising a first absorbent layer followed by a second adhesive layer (or the reverse) may be provided on the plate, or alternatively a single coating having combined absorption and adhesion characteristics. To this end, naturally absorbent adhesives may for example be used such as black glue or black solder glass, or adhesive made absorbent by incorporating elements such as carbon, transition metals, selenium etc.

Possible adhesive materials include materials which are naturally adhesive, materials which polymerize in air by the action of a catalyst or the addition of a second component, or epoxy resins, and in particular a tape material known commercially as Scotch 582. For fixing glass fibres, the adhesive material preferably used is a solder glass or an enamel with a suitable melting point.

The mechanical implantation method consists essentially of inserting the fibres into the adhesive layer by any appropriate mechanical means, using if necessary a fine mesh grid or any separator device designed to maintain the required distance between the fibres during their implantation.

The electrostatic flocking method is a well known industrial process, characterised by projecting fibres in an oriented manner in the direction of a target on which they are to be planted. The fibres are oriented by electrostatic forces resulting from setting up a high continuous electric field. As the individual fibres become oriented during their path to the target parallel to the lines of force, it is possible to control their angular position on their arrival at this target by adjusting for example the speed with which the target files past the stream of flocked fibres.

Figure 7:
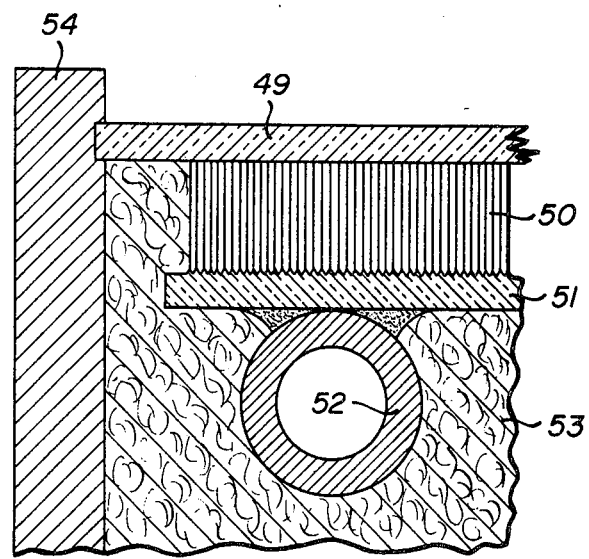
FIG. 7 is a longitudinal section through a another embodiment

FIG. 7 shows a fibre network implanted in a baseplate obtained by a drawing process applied directly to the baseplate. The drawing process consists of simultaneously drawing a large number of fibres from a layer of thermoplastic or chemically softenable material (soft glass, organic material etc.) which covers the baseplate. Such a process has the advantage of providing strictly parallel fibres even if they are long and densely close together.

FIG. 7 shows a modification in which an auxiliary transparent plate 49 is used, attached to the ends of the fibres 50 after these latter have been drawn from a baseplate 51 (on the rear face of which are fixed heat transfer tubes 52, for example by welding). As can be seen from this figure, the resultant "sandwich" already constitutes a flat solar collector ready for operation (after thermal insulation 53 of the rear and side walls 54). The main advantage of this modification is its high resistance to mechanical shock (vandalism, hail etc.). As the auxiliary plate 49 is in effect supported by the fibres 50 in an almost optimum manner, it is effectively protected against any breakage. This result is particularly important where the plate 49 is of glass.

As a modification, the plates 49 and 51 and the tubes 52 may be made of a flexible plastics material. In this case, it is possible to construct a solar collector which is flexible in particular in a direction transverse to the tubes 52. Thus solar collectors in strip form may be conceived, for manufacture and transportation in the form of rolls. This modification particularly allows large solar collector areas to be rapidly laid. This converter modification is equally suitable for non-solar radiation heating. The baseplate 51, the fibres 50 and the transparent plate 49 form the wall (or base) of a chemical reactor, a thermostatically heated enclosure or a pan. The load is heated by thermal conduction through the plate 51. FIGS. 8 and 9 show a converter according to the invention obtained by weaving or tufting. Weaving methods such as those used for manufacturing velvet notably provide systematic cutting of part of the weft (or possibly the warp). With the majority of fibres, the cut parts bend upwards so that a woven structure can be obtained which satisfies the requirements of the converter according to the invention. The tufting process, equally well known, enables networks of fibres to be obtained which are longer than those possible with weaving.

Ideally, a textile structure adapted to serve as a converter should be composed of black warp threads, (i.e. absorbent to the incident radiation and resistant to heat) and weft threads (or threads introduced by tufting) which are transparent, non-diffusing and equally resistant to heat. As the resultant textile structures are in general not fluid-tight, they are particularly suitable for incorporation in solar collectors using a gas as the heat transfer medium.

FIG. 8 shows such a textile structure, composed of a black warp 57, uncut weft threads 58, preferably also black, and cut weft threads 59 which are transparent and curved upwards (the reference numerals 60 and 61 indicate the direction of the incident radiation and the direction of gas flow relative to this structure, respectively).

FIG. 9 shows a solar collector equipped by way of example with two textile structures 63 and 64, which operate as heat exchangers to air. This solar collector comprises an enclosure 65 inclined towards the south, its front face consisting of a transparent plate 66 and its inner rear and side walls being provided in the usual manner with porous thermal insulation 67 (glass wool or rock wool, organic fibre, cork etc.). The thermal insulation 67 is advantageously covered internally with a metal sheet 68 of low emissivity (for example nickel, aluminium etc.). The two textile structures 63 and 64 are disposed one below the other inside the enclosure 65, between the front transparent plate 66 and the metal sheet 68, so as to absorb nearly the whole of the incident radiation. The enclosure 65 is provided with an inlet aperture 69 for the cold air in its lower lateral wall in the vicinity of the converter plate 66, and an outlet aperture 70 for the hot air in the upper lateral wall behind the two textile structures 63 and 64. The operation of such a solar collector is particularly simple. The cold air penetrates into the collector through the inlet aperture 69, it is then blown through the textile structures 63 and 64 in which it heats up, and finally leaves the collector through the outlet aperture 70 (the path taken by the air is diagrammatically illustrated on the drawing by the arrows 71).

In such an arrangement it is in no way necessary for the constituent material of the textile structures to have high thermal emissivity for all infrared wavelengths. It is sufficient for both the vertical fibres (weft) and the fibres situated in the plane of the woven structures (warp and uncut weft) to have identical spectral absorption and transmission bands within the thermal infrared wavelength range. In operation, the air space between the metal sheet 68 and the structures 63 and 64 acts only as a black body cavity at the converter temperature for those infrared wavebands for which the constituent textile material of the converter is absorbent. For all other infrared thermal wavebands, the radiation temperature inside the collector approaches the (lower) temperature of the converter plate 66 if this latter is opaque in the thermal infrared.

It is equally possible to make solar collectors by knitting. In this case, the base of the fabric is impregnated (before cutting the knitted threads intended to serve as the fibres) with a material such as a blackened thermosetting resin. This method enables the fibre structure to be fixed directly on to a baseplate containing conduits for a heat transfer fluid. At the same time the resin enables better fibre stability and parallelism to be obtained. It also serves as the absorbent layer.

FIG. 10 shows a photothermal converter according to the invention constructed by methods similar to those used in the manufacture of brushes. Brush structures are characterised by fixing bundles of fibres on to a solid support, this fixing being either mechanical (inserting fibres into a network of holes and slots) or by means of an adhesive. Brush structures have the advantage of a simple mechanical fixing method combined with a practically unlimited choice of both fibre material and fibre geometry (in contrast to weaving and flocking techniques). It is consequently possible to use for example fibres longer than those usable in flocking, with consequent improved thermal insulation of the converter.

The solar converter structure shown in FIG. 10 has a cylindrical geometry analogous to that used with cylindrical-parabolic concentrators or fixed concentrators fitted with a mobile (cylindrical) converter following the centre of the sun. A multitude of fibre bundles 74 are pinched radially at their base between a plurality of washers or nuts 75 mounted one after another on a heat exchanger tube 76, and kept clamped one against the other, for example by a compression spring 77. The individual fibres of the bundles 74, several centimeters long, are preferably made of a refractory material such as silica or glass. The surface of the washers 75 (preferably of V shape) is blackened in a suitable manner (for example by oxidation) so as to be able to absorb the greatest possible amount of solar radiation focused on the converter. A suitable heat transfer fluid 78 (for example pressurised water, liquid polyphenyl or a gas such as $CO_2$) circulates in the tube 76.

This solar converter structure may be disposed advantageously inside a coaxial glass tube (not shown on the drawing) which in general does not need to be evacuated.

The advantage of such a converter of brush form is that the fibres may be relatively long, and thus able to provide very effective thermal insulation. Moreover, the fibres and the absorbent surface are constituted by oxides which have excellent long term stability in a hot air (and thus oxidizing) environment. Such a converter is therefore particular suitable for supporting very high radiation intensities, and consequently very high operating temperatures, without undergoing any alteration.

The photothermal converter according to this invention presents a certain number of advantages. Because of suppression of convection, it possesses firstly a high conversion efficiency, in particular for large temperature differences between the converter and surroundings. Its efficiency is in fact comparable with that of known evacuated photothermal converters. Compared with the thin selective spectrum absorption layers of known photothermal converters, it has a very favorable performance-cost ratio and may be mass produced economically. Finally, it has a higher solar radiation absorption coefficient than that obtainable with known selective spectrum absorption layers. Although the present invention has been described in connection with certain specific embodiments and examples, such description is meant to be illustrative only and not restrictive or limiting, and it is to be understood that various changes and modifications may be resorted to by those skilled in the art without departing from the spirit and scope of the invention.

We claim:

1. Photothermal converter apparatus for converting incident photon energy into heat, comprising a heat-absorbing surface and a multiplicity of substantially parallel fibres secured to said surface and extending substantially rectilinearly therefrom and having a length of at least about 1 cm, said fibers being arranged substantially equidistant from each other and being comprised of a material which is transparent to the incident photon energy and at least partially opaque to infrared thermal radiation re-emitted by said surface, whereby said fibres act as a light guiding structure with respect to the incident photon energy and serve to suppress energy losses from the converter by inhibiting infrared thermal reradiation from said surface and by inhibiting convection losses.

2. The apparatus of claim 1, wherein said fibers are of a substantially uniform length.

3. The apparatus of claim 1, wherein said fibers have a length of from about 1 cm to about 10 cm.

4. The apparatus of claim 1, wherein said fibers are disposed substantially perpendicularly to said surface.

5. The apparatus of claim 1, wherein said fibers are disposed substantially obliquely to said surface.

6. The apparatus of claim 1, wherein said fibers have a substantially circular cross-section.

7. The apparatus of claim 1, wherein said fibers have a width of from about 25 $\mu$m to about 500 $\mu$m.

8. The apparatus of claim 1, wherein the average spacing between the fibers is from about 100 $\mu$m to about 5000 $\mu$m.

9. The apparatus of claim 1, wherein said fibers have a length of about 5 cm and a width of about 70 $\mu$m, with the filling density of said fibers on said surface being about 500 fibers/cm$^2$.

10. The apparatus of claim 1, wherein said fibers have a flattened cross-section.

11. The apparatus of claim 1, wherein said fibers are hollow.

12. The apparatus of claim 1, wherein said fibers are comprised of glass or plastic.

13. The apparatus of claim 1, wherein said fibers have been mechanically or electrostatically implanted into said surface.

14. The apparatus of claim 1, wherein said fibers have been drawn from said surface while in a softened state.

15. The apparatus of claim 1, wherein said fibers are woven into, and project from, a woven material.

16. A flat plate solar collector having the photothermal converter apparatus of claim 1 incorporated therein, wherein said converter apparatus is positioned beneath the transparent cover means of the collector and the heat transfer fluid of the collector passes through fluid conveying means which are connected in heat-exchanging relation with said heat-absorbing surface.

17. A parabolic concentrator solar collector having the photothermal converter apparatus of claim 1 incorporated therein in duplicate, wherein said two converter apparatus are positioned beneath the transparent cover means of the collector with the fibers of one converter facing said cover means and the fibers of the other converter facing the concentrator means of the collector, and wherein the heat transfer fluid of the collector passes through fluid conveying means which are connected in heat-exchanging relation with the heat-absorbing surface of each of said converters.

18. A heating vessel adapted to transmit heat energy to a material contained therein and comprised of an outer transparent wall adapted to transmit solar radiation therethrough, said radiation having been directed toward the outer wall in part by an external solar reflector system, and an inner wall positioned within said outer wall and spaced therefrom, with said inner wall being adapted to contain said material and to conduct heat inward thereto from its outer surface, and with said inner wall having the photothermal converter apparatus of claim 1 secured to its outer surface.

19. The apparatus of claim 1, wherein said fibers have a length of from about 1 cm to about 10 cm and a width of from about 25 $\mu$m to about 500 $\mu$m, and wherein the average spacing between fibers is from about 100 $\mu$m to about 5000 $\mu$m.

20. The apparatus of claim 1, wherein said fibers are distributed on said surface in a substantially random manner.

21. The apparatus of claim 1, wherein said fibers are distributed on said surface in a substantially uniform manner.

22. The apparatus of claim 1, wherein said heat-absorbing surface is comprised of a baseplate covered with a layer which is adapted to adhere to the end portions of said fibers which are secured thereto, and to absorb incident solar radiation.

23. The apparatus of claim 22, wherein said base-plate is metallic.

24. The apparatus of claim 1, wherein said heat-absorbing surface is comprised of a baseplate covered with two layers, with the first layer being adjacent the baseplate and being adapted to absorb incident solar radiation, and the second layer being adjacent the first layer and being adapted to adhere to the end portions of said fibers which are secured thereto.

25. The apparatus of claim 1, wherein said heat-absorbing surface is comprised of a baseplate covered with two layers, with the first layer being adjacent the baseplate and being adapted to adhere to the end portions of said fibers which are secured thereto, and the second layer being adjacent the first layer and being adapted to absorb incident solar radiation.

26. A process for manufacturing the apparatus of claim 1 comprising the steps of:
(a) providing a baseplate;
(b) covering the baseplate with a layer of a normally solid material which is capable of being temporarily softened to a plastic state, said material being adapted to absorb incident solar radiation;
(c) softening the layer to its plastic state;
(d) then implanting the end portions of said fibers in said plastic layer; and
(e) then solidifying said layer, whereby said fibers are firmly secured to said layer.

* * * * *